United States Patent [19]

Wolinski et al.

[11] 4,230,613

[45] Oct. 28, 1980

[54] PEROXY-FREE METHACRYLATE LACQUER AND ADHESIVE METHOD EMPLOYING SAME

[75] Inventors: Leon E. Wolinski, Cheektowaga; Peter D. Berezuk, Kenmore, both of N.Y.

[73] Assignee: Pratt & Lambert, Inc., Buffalo, N.Y.

[21] Appl. No.: 18,161

[22] Filed: Mar. 7, 1979

[51] Int. Cl.$^2$ ............ C08K 5/05; C08K 5/13; C09J 5/00
[52] U.S. Cl. ............ 156/315; 156/327; 156/331; 260/33.4 R; 428/522
[58] Field of Search ............ 526/329.2, 329.7, 303; 260/33.8 UA, 33.4 R

[56] References Cited

U.S. PATENT DOCUMENTS

| | | | |
|---|---|---|---|
| Re. 27,093 | 3/1971 | Slocum | 526/57 |
| 3,290,257 | 12/1966 | Bader | 526/57 |
| 3,860,563 | 1/1975 | Katsimbas et al. | 260/33.4 R |
| 3,893,960 | 7/1975 | Sheppard | 260/33.4 R |
| 4,074,004 | 2/1978 | Bateson et al. | 526/303 |
| 4,077,926 | 3/1978 | Sanderson et al. | 526/317 |

*Primary Examiner*—Joseph L. Schofer
*Assistant Examiner*—Peter F. Kulkosky
*Attorney, Agent, or Firm*—Christel, Bean & Linihan

[57] ABSTRACT

A peroxy catalyst activator is dissolved in a methyl methacrylate, ethyl methacrylate or styrene lacquer containing, in addition, an adhesion promotor, e.g., an acrylic or methacrylic compound such as the carboxylic acids, amides esters having in the ester moiety amino groups or epoxy groups. The lacquer comprises a copolymer of the monomers dissolved in a volatile liquid solvent such as a mixture of toluene and isopropanol. In use, the lacquer containing the activator is applied to at least one of two substrates and allowed to dry. Thereafter, an adhesive composition containing peroxy catalyst is applied to at least one substrate and both substrates are brought into contact and held until the adhesive bond is formed.

The lacquer acts to seal porous substrates and permits the cure to take place rapidly without air inhibition. It forms a surface which retains its activity over a long time period, running into years. Thus, component parts may be coated with the lacquer and stored until needed.

21 Claims, No Drawings

PEROXY-FREE METHACRYLATE LACQUER AND ADHESIVE METHOD EMPLOYING SAME

BACKGROUND OF INVENTION

This invention relates to adhesive components having long-term stability.

In application Ser. No. 763,145 to Wolinski et al filed Jan. 27, 1977, now U.S. Pat No. 4,126,504 by reference, there are described activatable curable adhesive composition comprising an elastomer, a free radical addition polymerizable acrylic monomer, a free radical addition polymerizable acid monomer copolymerizable with the acrylic monomer and a peroxy catalyst. In use, at least one of a pair of mating surfaces is coated with the adhesive composition and at least one surface is coated with a composition comprising a peroxy catalyst activator. Both surfaces are joined together and maintained in a contact relationship until the adhesive cures to a set.

This adhesive composition gives excellent results when applied to dense substrates and which are joined together within not too long a period after the application. However, if a long time elapses between the time a substrate is coated with activator and the time the joining takes place, the results may not be as satisfactory. Likewise, a porous substrate results in weaker bonding.

For a number of applications it would be a significant advantage if a substrate could be coated with a composition containing a peroxy catalyst activator and stored until needed. Also, treating a porous substrate to prevent a weak adhesive bond would be highly desirable. Thereafter at a later time which may be years later, on applying the adhesive composition, such as described in application Ser. No. 763,145, now U.S. Pat. No. 4,126,504, to the same or another substrate, two substrates can be adhesively joined together.

DESCRIPTION OF PRIOR ART

U.S. Pat. No. 3,658,624 discloses a two component adhesive wherein one component consists of an amine activator which is dissolved in a glycol ester of an acrylic acid or an amide of an acrylic acid and the other component consists of an acrylic monomer plus a peroxy catalyst. The compositions are shown applied to glass or steel substrates and long term stability of the separate components are alleged.

U.S. Pat. No. 2,703,776 shows coating a fabric with a solution of polymethylmethacrylate in methylene chloride containing a peroxy catalyst. After drying, the coated fabric is wetted with methyl methacrylate having an amine activator dissolved therein.

The above patents are the closest prior art of which applicant is aware but, as discussed below, differ significantly from the invention described herein.

SUMMARY

This invention relates to a lacquer composition containing peroxy catalyst activator and adapted to seal a porous substrate and to form an activated surface having extremely long-term stability. The lacquer composition is applied in a solution and consists of a copolymer of (a) methyl or ethyl methacrylate or styrene monomers, (b) with an adhesion promoter to be described in detail below, dissolved in a volatile solvent and containing an activator for a peroxy catalyst. Additionally, it relates to the method employing the lacquer composition and to the article coated thereby. As employed herein the term *lacquer composition* refers to the copolymer of the methyl or ethyl methacrylate or styrene monomer with the adhesion promotor monomer and any unreacted monomers present. The term *lacquer composition solution* refers to the solution of the lacquer composition in volatile solvent plus peroxy catalyst activator.

It is an object of the present invention to provide a lacquer composition solution for application to a substrate to seal the surface thereof, to form an activated surface having extremely long-term stability and which permits the cure of adhesive during bonding of two substrates to take place rapidly without air inhibition.

It is a further object to provide a lacquer composition in a volatile solvent containing a peroxy catalyst activator; comprising an amine; a methyl or ethyl methacrylate, or styrene; an adhesion promoter comprising an acrylic or methacrylic compound such as carboxylic acid, amides, and esters having in the ester moiety epoxy groups or amino groups.

Yet another object of the invention is to provide a method for coating a substrate with the said lacquer composition solution whereby to provide an activated surface having extremely long-term stability, and to an article having the said coated substrate.

A further object of the invention is to provide a method for adhesive bonding by contacting the said substrate coated with the lacquer composition and activator with another substrate coated with an adhesive composition containing a peroxy catalyst and maintaining the contact relationship until the adhesive cures to a set.

Additional objects will be apparent from the following disclosure of the invention.

DESCRIPTION OF THE INVENTION

The lacquer composition of this invention has its main ingredient methyl methacrylate, ethyl methacrylate or styrene. Methyl methacrylate is highly soluble in the formulation and is therefore convenient to use. However, styrene and ethylmethacrylate may be employed with satisfactory results. Another ingredient is an adhesion promoter which is an acrylate or methacrylate having adhesion promoting groups such as acid, amino, amido or epoxy groups present, and (2) a softening monomer such as butyl acrylate or 2-ethyl hexyl acrylate may be optionally present.

The broad and preferred ranges of the various components of the lacquer composition are given in the following table. All percentages are weight percent and exclude the solvent.

TABLE I

| Monomer | Broad Range | Preferred Range | Specific Composition |
| --- | --- | --- | --- |
| Methylmethacrylate or | 65–98 | 90–98 | 98 |
| ethylmethacrylate or | 65–98 | 90–98 | 98 |
| styrene | 65–98 | 90–98 | 98 |
| Adhesion promoter | 2–35 | 2–10 | 2 |
| Softening monomer | 0–33 | 0–8 | 0 |

The adhesion promoter may be acrylic acid, methacrylic acid, acrylamide, methacrylamide, N,N dimethyl ethyl amino methacrylate, aziridinal methacrylate and the post reaction products of acrylic or methacrylic acid with (a) ethylene imine, (b) propylene imine or (c) hydroxyethy ethylene imine. These post-reaction products are the following:

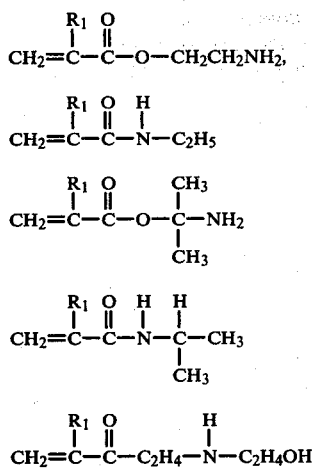

wherein $R_1 = H$ or $CH_3$

The main monomer component, e.g. methyl methacrylate, ethyl methacrylate or styrene, copolymerizes with the acrylate or methacrylate adhesion promoter, the functional groups in the latter providing the adhesion to the various substrates. A chlorinated hydrocarbon or a toluene/isopropanol 70/30 mixture is employed as a volatile solvent to dissolve the components and copolymer products to form a lacquer composition solution containing 20-40% non-volatile lacquer components.

To the lacquer solution is added the peroxy catalyst activator. This may be a tertiary amine such as N,N dimethyl analine, N,N-diethyl aniline, N,N dimethyl p-toluidine and the like. A preferred tertiary amine is 4,4'-methylene bis (N,N-dimethyl aniline). Other tertiary amines which may be employed are the non-irritating and non-toxic tertiary amines of copending application Ser. No. 858,702.

Toxic tertiary amine activators when dissolved in the lacquer of this invention appear to be rendered non-toxic. While a full explanation for this phenomenon is not known at present, it is thought that the toxic moiety of the activator in some monomer is tied up effectively by the lacquer composition. The weight ratio of activator to lacquer composition (excluding the solvent) may vary from 5:95 to 95:5.

From the above it is apparent that the present invention differs from U.S. Pat. Nos. 2,703,776 and 3,685,624 in the presence of the methyl or ethyl methacrylate or styrene/adhesion promotor copolymer in the lacquer, with the attendent benefits as set forth.

EXAMPLES

The following table sets forth various examples showing different lacquer compositions within the scope of this invention and the lap strengths obtained on different substrates. The compositions are applied to the substrates and allowed to dry. Comparative examples are given showing the lap strength results achieved in the absence of the lacquer. The adhesive base employed was that described in copending application Ser. No. 763,145 and was composed (in weight percent) of 36.95% methyl methacrylate, 31.5% acrylic acid, 0.11% hydroquinone, 6.41% Epirez 530 C (a diglycidyl ether of bisphenol A polyepoxy available from Celanese Coating and Specialty Co.), 25.03% Hycar 1072 (a carboxy modified medium high acryloritrile/butadiene rubber available from B.F. Goodrich Co. Inc.) to which 4.0% of benzoyl peroxide was added.

TABLE II

OPERATIVE EXAMPLES WITH ADHESIVE BASE CONTAINING 4% BENZOYL PEROXIDE

| Example | Lacquer | Composition | % | Activator | % | Substrate | Lap Shear (PSI) |
|---|---|---|---|---|---|---|---|
| | (20% in 70/30 Toluene/ Isopropanol | | | | | | |
| 1 | MMA/AA | 98/2 | 95 | MBA | 5 | Oak Wood | 1100 tore wood |
| 2 | MMA/AA | 98/2 | 0 | MBA | 100 | Oak Wood | 85-700 variable due to pentration of MBA into the wood |
| 3 | MMA/AA | 98/2 | 70 | MBA | 30 | Steel | 2840 |
| 4 | MMA/AA | 98/2 | 0 | MBA | 100 | Steel | 2900 |
| 5 | MMA/BA/AA | 65/29/6 | 70 | MBA | 30 | Oak | 1100 tore wood |
| 6 | MMA/BA/AA | " | 70 | MBA | 30 | Steel | 2250 lower because of BA |
| 7 | MMA/BA/AA | " | 70 | MBA | 30 | Leather | 550 tore leather |
| 8 | MMA/BA/AA | " | 0 | MBA | 100 | Leather | 0-300 varies because of absorption of MBA in the leather |
| 9 | MMA/GMA | 98/2 | 70 | MBA | 30 | Steel | 2800 |
| 10 | MMA/AMA | 98/2 | 70 | MBA | 30 | Steel | 2820 |
| 11 | MMA/GMA | 98/2 | 50 | MBA | 50 | Steel | 2850 |
| 12 | MMA/GMA | 98/2 | 25 | MBA | 75 | Steel | 2850 |
| 13 | MMA/GMA | 98/2 | 5 | MBA | 95 | Steel | 2800 |
| 14 | MMA/GMA | 98/2 | 5 | MBA | 95 | Oak | 800-950 |

CODE:
MMA = Methyl Methacrylate
AA = Acrylic Acid
MAA = Mehtacrylic Acid
BA = Butyl Acrylate
MBA = 4,4'-Methylene bis (N,N-Dimethyl Aniline)
GMA = Glycidyl Methyacrylate
Ama = Aziridinal Methacrylate A comparison of Examples 1 to 2 shows the effect of the use of a lacquer including MBA, and MBA alone, on an oak wood substrate. Due to porosity, the activator in Example 2 (MBA alone) penetrated into the wood and air inhibition occurred. As shown in Example 1, using the lacquer composition resulted in a lap shear strength over 57% greater than that obtained in the absence of the lacquer.

Examples 3 and 4 show that with a dense, impervious surface such as steel, the lap shear strengths results are approximately the same.

Examples 5 and 6 show the results achieved with oak and steel substrates respectively. It will be noted that the adhesive bond was stronger than the wood.

Examples 7 and 8 show the results obtained with and without lacquer on a leather substrate. With the lacquer plus MBA the bond was stronger than the leather and had a lap shear strength of at least 83% greater than that obtained with MBA alone.

Examples 9-12 show the results achieved with lacquers and differing amounts of activator on a steel substrate. Examples 13 and 14 show the results achieved with the same lacquer/activator composition on steel and oak substrates. The results obtained with steel, except for example 6, are substantially the same in all the examples. In Example 6, the use of a butyl acrylate softener resulted in a lower lap shear value. However, these tests do not take into account any elapsed time from the coating of the surface with the MBA composition and the time the adhesive base is added. The lacquer retains the activator, while merely coating the surface with MBA would result in the latter's gradual elimination over an extended time period.

In the absence of the adhesion promoting groups in the lacquer the bond strength is far lower, in the range of about 500-800 psi. As shown above, using lacquers having adhesion promoting groups, bond strengths are obtained equivalent to those obtained using the activator without lacquer. It is apparent that the lacquer composition containing the adhesion promoting groups forms a long-term stable surface without the deleterious effect of decreased bond strength.

To show the effects of omitting the adhesion promoter from the lacquer composition, the following tests were run:

EXAMPLE 15

This was similar to Example 3 in Table II, but omitted the AA adhesion promoter in the lacquer composition. The lap shear value was 500 to 600 p.s.i. as compared to 2840 p.s.i. of Example 3.

EXAMPLE 16

This was similar to Example 7 of Table II but omitted the AA adhesion promoter in the lacquer composition. The lap shear value was 200 to 300 p.s.i. as compared to >550 p.s.i. of Example 7.

Examples 15 and 16 show that a serious loss of bond strength results from omission of the adhesion promoter.

The following Examples illustrate the difference of long-term stability of substrates containing activator and lacquer and those containing activator alone.

EXAMPLE 17

Samples of coated steel substrates as in Example 3 of Table II were kept at (a) room temperature and (b) at 60° C. No difference in bond strength of the samples kept at these temperatures for fourteen months.

EXAMPLE 18

Samples of steel coated substrates coated with activator alone as in Example 4 of Table II were kept at (a) room temperature and (b) at 60° C. After one year, the bond strength of the room temperature samples was about 2600 p.s.i. and the 60° C. samples about 1400 p.s.i.

EXAMPLE 19

Samples of leather substrates coated with lacquer plus activator as in Example 7 of Table II were kept at (a) room temperature and (b) at 60° C. After fourteen months, the tearing bonds in the case of both temperatures were in excess of 500 p.s.i.

EXAMPLE 20

Samples of wood substrates coated with 100% activator as in Example 2 of Table II were kept at (a) room temperature and (b) at 60° C. After 14 months, variable results were obtained with the room temperature samples, with a maximum lap shear strength of 100 p.s.i. With the 60° C. samples, no adhesion was present.

EXAMPLE 21

Tests similar to Example 20 were run, except that a lacquer/activator composition containing about 20% by weight of a solid polymer composed of 98% methylmethacrylate, 2% acrylic acid and 20% by weight of the activator MBA. Thus, the final composition of 20% (98/2, MMA/acrylic acid) and 20% MBA was employed. After 12 and 14 months, deep wood rupture was obtained in shearing tests with both the room temperature and 60° C. samples.

Examples 17-21 demonstrate that the presence of lacquer in the activator composition results in an increase of long-term stability in the coated substrates, as compared to the stability under the same conditions in the absence of lacquer.

We claim:

1. A peroxy-free lacquer composition for coating a substrate and serving as a vehicle for a peroxy catalyst activator, the activator-containing coating on the substrate being adapted to be brought into contact with an adhesive containing a peroxy catalyst, the said lacquer composition comprising, in weight percent, copolymerizable monomers consisting of (A) 65 to 98% of a monomer selected from the group consisting of methyl methacrylate, ethyl methacrylate and styrene, (B) 2 to 35% of an adhesion promoter selected from the group consisting of

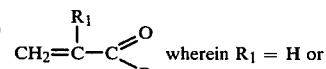 wherein $R_1$ = H or

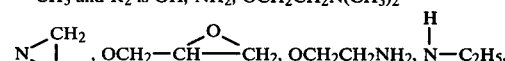

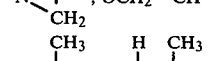

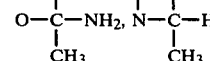

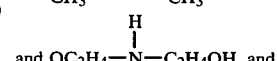

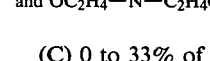

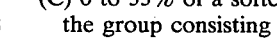

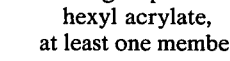

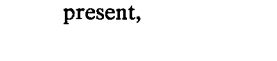

(C) 0 to 33% of a softening monomer selected from the group consisting of butyl acrylate and 2-ethyl hexyl acrylate, at least one member of (A) and (B) respectively being present, the said lacquer composition consisting of copolymers and any unreacted monomers, (D) the said lacquer composition being dissolved in a volatile solvent to form a solution containing 20 to 40% lacquer composition, and (E) an tertiary amine activator for a peroxy free radical polymerization catalyst dissolved in said solution in a ratio of activator: lacquer composition of 5:95 to 95:5.

2. The lacquer composition of claim 1 wherein the weight percent of (A) is 90 to 98, the weight percent of (B) is 2 to 10, the weight percent of (C) is 0 to 8.

3. The lacquer composition of claim 2 wherein the weight percent of (A) is 98, the weight percent of (B) is 2, and the weight percent of (C) is 0.

4. The lacquer composition of claim 1 wherein the solvent is a mixture in weight percent of 70 toluene and 30 isopropanol, the lacquer solution containing 20% of said lacquer composition, and the activator is 4,4'-methylene bis (N, N, -dimethyl aniline).

5. The lacquer composition of claim 4 wherein (A) is 98% methylmethacrylate, (B) is 2% acrylic acid, and the ratio of (B):(A) is 5:95.

6. The lacquer composition of claim 5 wherein (A) is 98% methylmethacrylate, (B) is 2% acrylic acid, and the ratio of (B):(A) is 30:70.

7. The lacquer composition of claim 4 wherein (A) is 65% methylmethacrylate, (B) is 6% acrylic acid, (C) is 29% butyl acrylate and the ratio of activator to the lacquer components is 30:70.

8. The lacquer composition of claim 4 wherein (A) is 98% methyl methacrylate, (B) is 2% glycidyl methacrylate, and the ratio of activator to the lacquer composition is from 30:70 to 95:5.

9. The lacquer composition of claim 4 wherein (A) is 98% methyl methacrylate, (B) is 20% aziridinal methacrylate, and the ratio of activator to the lacquer composition is 30:70.

10. In a structure having a first surface adapted to be adhesively joined to a second mating surface, the improvement comprising;

having a coating on said first surface comprising a peroxy-free lacquer composition comprising in weight percent a copolymer of monomers consisting of (A) 65 to 98% of a monomer selected from the group consisting of methyl methacrylate, ethyl methacrylate and styrene, (B) 2 to 35% of an adhesion promoter selected from the group consisting of $$CH_2=C-C-R_2 \text{ wherein } R_1 = H \text{ or}$$
$$\overset{R_1}{|} \overset{O}{\|}$$

$CH_3$ and $R_2$ is OH, $NH_2$, $OCH_2CH_2N(CH_3)_2$

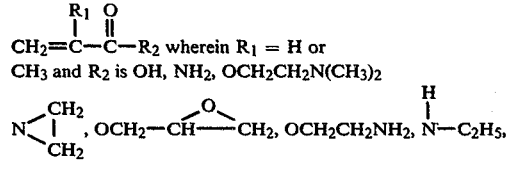, $OCH_2-CH-CH_2$, $OCH_2CH_2NH_2$, $N-C_2H_5$,

-continued

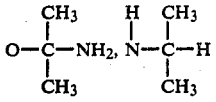

and $OC_2H_4-N-C_2H_4OH$, and (C) 0 to 33% of a softening monomer selected from the group consisting of butyl acrylate and 2-ethyl hexyl acrylate, at least one member of (A) and (B) respectively being present, and (D) an activator for a peroxy free radical polymerization catalyst, the ratio of activator: lacquer composition being 5:95 to 95.5.

11. The structure of claim 10 wherein the lacquer composition comprises 90–98% of (A), 2–10% (B), 0–8% of (C) and the activator is a tertiary amine.

12. The structure of claim 11 wherein (A) is 98% (B) is 2% (C) is 0.

13. The structure of claim 10 wherein the activator is 4,4'-methylene bis (N,N-dimethyl aniline).

14. The structure of claim 10 wherein (A) is 98% methyl methacrylate and (B) is 2% acrylic acid the ratio of activator to lacquer composition is 5:95.

15. The structure of claim 10 wherein (A) is 98% methyl methacrylate and (B) is 2% acrylic acid the ratio of activator to lacquer composition is 30:70.

16. The structure of claim 13 wherein (A) is 65% methyl methacrylate, (B) is 6% acrylic acid and (C) is 29% butyl acrylate.

17. The structure of claim 13 wherein (A) is 98% methyl methacrylate, (B) is 2% glycidyl methacrylate and the ratio of activator to the lacquer composition is from 30:70 to 95:5.

18. The structure of claim 13 wherein (A) is 98% methyl methacrylate, (B) is 2% azirindinal methacrylate and the ratio of activator to the lacquer composition is 30:70.

19. A method for adhesively joining a pair of mating surfaces comprising applying to at least one of said surfaces the lacquer composition solution of claim 1 containing an activator, allowing the solution to dry, applying to at least one of said surfaces an activatable curable adhesive comprising a non-reactive elastomer dissolved in a non-acid methacrylic or acrylic monomer and a methacrylic or acrylic acid monomer, the said adhesive containing an effective amount of an peroxy catalyst, the said adhesive being activatable by contact with a peroxy catalyst activator, joining the pair of mating surfaces in a contact relationship and maintaining the contact relationship until the said adhesive cares to a set.

20. The method of claim 19 wherein the activator is a tertiary amine.

21. The method of claim 19 wherein the activator is 4,4'-methylene bis (N,N-dimethyl aniline).